United States Patent [19]

Nakamura et al.

[11] 4,135,876

[45] Jan. 23, 1979

[54] METHOD FOR SIMULTANEOUSLY CALCINING FIRST KIND OF PULVERIZED MATERIALS CONTAINING COMBUSTIBLE COMPOUNDS AND SECOND KIND OF PULVERIZED MATERIALS

[75] Inventors: Norio Nakamura, Omiya; Satoshi Tominaga, Tama; Tsuneo Kobayashi, Ichikawa; Mitsuo Nagaoka, Higashikurume, all of Japan

[73] Assignee: Ishikawajima-Harima Jukogyo Kabushiki Kaisha, Ote-machi, Japan

[21] Appl. No.: 793,413

[22] Filed: May 3, 1977

[30] Foreign Application Priority Data

May 25, 1976 [JP] Japan .................................. 51-59639

[51] Int. Cl.² .............................................. F27B 15/00

[52] U.S. Cl. ....................................... 432/14; 110/244; 110/245

[58] Field of Search ........................... 432/14, 15, 58; 110/28 A, 28 F, 244, 245

[56] References Cited

U.S. PATENT DOCUMENTS

| 3,863,577 | 2/1975 | Steever et al. | 432/15 |
| 3,869,248 | 3/1975 | Hirai et al. | 432/14 |

Primary Examiner—John J. Camby
Attorney, Agent, or Firm—Scrivener, Parker, Scrivener & Clarke

[57] ABSTRACT

Disclosed is a method for calcining pulverized raw cement materials or alumina materials prior to a burning process, a first kind of pulverized materials containing combustible compounds and a second kind of pulverized materials being simultaneously calcined.

2 Claims, 4 Drawing Figures

METHOD FOR SIMULTANEOUSLY CALCINING FIRST KIND OF PULVERIZED MATERIALS CONTAINING COMBUSTIBLE COMPOUNDS AND SECOND KIND OF PULVERIZED MATERIALS

DETAILED DESCRIPTION OF THE INVENTION

In general, the pulverized materials containing combustible compounds are introduced by gravity through a chute into a furnace so that they do not float and drop to be accumulated on the bottom. Furthermore they are not satisfactorily mixed with the combustion air and other pulverized materials with the resulting incomplete combustion. A pulverized coal burner is an example of means for transporting finely divided or pulverized combustible materials or solid fuel and spraying them into the furnace. In general, the ratio of the weight of the pulverized coal to that of the air is as low as from 0.3 to 0.5 so that a relatively large quantity of excess air remains, causing the increase in quantity of fuel used in a whole system.

In view of the above, one of the objects of the present invention is to provide a method for ensuring the satisfactory floating of pulverized materials in the combustion air so that they may be uniformaly mixed with the latter and ratio of the weight of the pulverized material to the weight of combustion air may be increased, thus reducing the fuel consumption in a whole system.

The above and other objects, features and advantages of the present invention will become more apparent from the following description of two preferred embodiments thereof taken in conjunction with the accompanying drawings, in which.

Same reference numerals are used to designate similar parts throughout the figures.

FIRST EMBODIMENT, FIGS. 1, 2 AND 3

Figure 1:
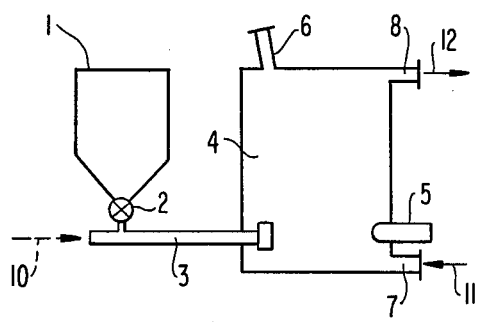
FIG. 1 is a diagrammatic front view of an apparatus adapted to carry out the method of the present invention.
Figure 2:
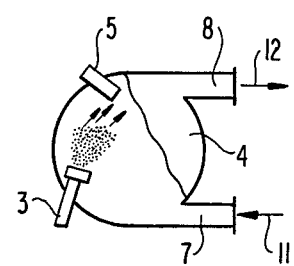
FIG. 2 is a fragmentary top view thereof.
Figure 3:
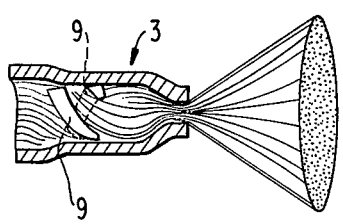
FIG. 3 is a schematic sectional view, on enlarged scale, of a burner thereof.

Referring to FIGS. 1, 2 and 3, reference numeral 1 denotes a bin storing therein pulverized materials containing combustible compounds; 2, a weigh feeder; 3, a pulverized-material burner with deflector means 9 (which are shown as being in the form of blades in this embodiment) for swirling the air flows; 4, a calciner; 5, an auxiliary burner; 6, an inlet of noncombustible materials; 7, a combustion air inlet; and 8, an exhaust port or outlet.

The pulverized materials containing combustible compounds such as oil shales are stored in the bin 1 and are introduced through the weigh feeder 2 into the burner 3. In the burner the pulverized materials containing combustible compounds are mixed with the compressed air flowing in the direction indicated by the arrow 10 in such a way that the ratio of the weight of the pulverized materials to the weight of the compressed air may be 8 to 10, and the swirling mixture of air and pulverized materials is injected into the calciner 4 as best shown in FIG. 3. In this embodiment, only one burner 3 is used, but it will be understood that a plurality of burners 3 may be used.

The calciner 4 has the auxiliary burner 5 extended through the side wall thereof and the inlet 6 at the top and the combustion air inlet 7 adjacent to the bottom. The combustion air may be a mixture of the two, one is, for instance, the combustion gases discharged from a succeeding kiln and the other is the heated air from the cooler. The air flows spirally upwardly along the inner wall of the calciner 4 from the inlet 7 to the outlet 8 as indicated by the arrows 11 and 12. The combustion air has preferably an oxygen content of 12 to 15%.

The axis of the nozzle hole or holes of the burner 3 is directed tangentially of the inner wall of the calciner 4.

The combustible compounds injected through the burner 3 are burned in the calciner 4 and mixed with the noncombustible materials charged through the inlet 6. More particularly, the pulverized materials containing combustible compounds are injected into the calciner 4, mixed with the combustion air charged through the inlet 7 and burned completely. The auxiliary burner 5 is so positioned that the flame may be made in contact with the front end of the sprayed pulverized materials containing combustible compounds. Therfore the stable combustion in the calciner 4 may be ensured when the combustion is started and when the pulverized materials having a low heating value are sprayed. Since the pulverized materials containing combustible compounds are swirled and sprayed they may be easily mixed with and entrained by the combustion air so that the accumulation of the pulverized materials on the bottom may be eliminated. In addition, the mixture of the pulverized materials charged through the burner 3 with the noncombustible materials charged through the inlet 6 may be facilitated by the swirling combustion air.

SECOND EMBODIMENT, FIG. 4

Figure 4:
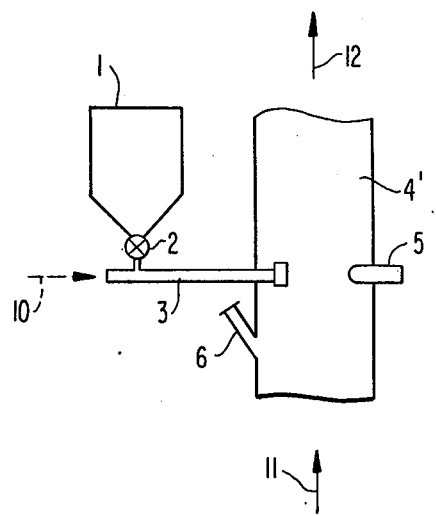
FIG. 4 is a diagrammatic front view of another apparatus adapted to carry out the method of the present invention.

In the second embodiment shown in FIG. 4, a combustion duct 4' is used which functions as a calciner. The combustion air which is a mixture of the two, one is the combustion gases from the kiln and the other is the heated air from the cooler and has an oxygen content of 12 to 15% is forced to flow straight through the combustion duct 4' as indicated by the arrows 11 and 12. Alternatively, it may be swirled along the inner wall of the combustion duct 4'. The inlet 6 for feeding the noncombustible materials is located adjacent to the inlet of the combustion duct 4'. When the combustion air is swirled, the burner 3 is directed tangentially of the inner wall of the combustion duct 4', but when the combustion air is made to flow straight through the duct 4', the burner 3 is so positioned that the pulverized materials containing combustible compounds may be sprayed to be entrained by the combustion air along the axis of its flow.

According to the present invention, the pulverized materials containing combustible compounds are sprayed and swirled in the combustion and heating chamber such as a calciner so that they may be satisfactorily distributed and mixed with the noncombustible materials charged through another inlet and with the combustion air. As a result, the complete combustion of combustible materials may be ensured and consequently no unburned combustible compounds may be discharged out of the combustion and heating chamber. Furthermore the accumulation of the noncombustible materials and pulverized materials containing combustible compounds may be eliminated. Since the ratio of the weight of the pulverized materials containing combustible compounds to the weight of the compressed air which carries the former is as high as 8 to 10, excess air is very small in quantity and consequently the consumption of fuel may be minimized.

What is claimed is:

1. A method for simultaneously calcining a first pulverized material containing combustible compounds and a second pulverized noncombustible material comprising the steps of:

(a) weighing a predetermined quantity of said first material containing combustible compounds and mixing with compressed air in such a way that the ratio of the weight of said first material to the weight of the compressed air may be between 8 and 10, (b) spraying and swirling the mixture of said first material and the compressed air into a calcining combustion and heating chamber, (c) charging said second pulverized material through an independent inlet into said combustion and heating chamber, and (d) introducing combustion air into said combustion and heating chamber, thereby burning the combustible compounds in said first pulverized material, and mixing and calcining said first and second pulverized material.

2. A method as set forth in claim 1 wherein said combustion air is preheated by the heat exchange with combustion gases discharged from a kiln and has an oxygen content between 12 and 15%.

* * * * *